(12) United States Patent
Camp et al.

(10) Patent No.: US 7,353,514 B1
(45) Date of Patent: Apr. 1, 2008

(54) COMPUTER SOFTWARE METHOD FOR ADMINISTERING BATCH JOBS

(75) Inventors: Brandon Camp, Austin, TX (US); James G. Mwaura, Irving, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 773 days.

(21) Appl. No.: 09/698,729

(22) Filed: Oct. 27, 2000

(51) Int. Cl.
*G06F 9/46* (2006.01)
*G06F 3/00* (2006.01)

(52) U.S. Cl. .................... 718/101; 719/328; 719/329
(58) Field of Classification Search ............ 709/1–108, 709/310–400; 718/1–108; 719/310–400
See application file for complete search history.

(56) References Cited

U.S. PATENT DOCUMENTS

| | | | | |
|---|---|---|---|---|
| 5,327,559 A | * | 7/1994 | Priven et al. ............... | 718/101 |
| 5,835,763 A | * | 11/1998 | Klein ......................... | 718/101 |
| 6,349,333 B1 | * | 2/2002 | Panikatt et al. ............. | 709/223 |
| 6,519,594 B1 | * | 2/2003 | Li ............................... | 707/10 |
| 6,625,651 B1 | * | 9/2003 | Swartz et al. ............... | 709/226 |
| 6,640,244 B1 | * | 10/2003 | Bowman-Amuah ......... | 709/207 |

* cited by examiner

*Primary Examiner*—Meng-Al T. An
*Assistant Examiner*—Kenneth Tang (57) ABSTRACT

The present invention discloses a method for processing batch jobs. A batch job is wrapped to create an application programming interface for communication with a batch framework. The batch framework comprises a batch dispatcher class, and the batch dispatcher class further comprises a method to execute the batch job. The batch framework is invoked according to a predetermined schedule. The batch job may reside locally with the batch framework remotely from the batch framework. In a preferred embodiment, the batch framework is invoked by a scheduling service, preferably the AutoSys scheduling service on Unix platform. The AutoSys scheduling service further executes a command line parameter, either a Unix shell script or a Windows NT batch file.

21 Claims, 4 Drawing Sheets

COMPUTER SOFTWARE METHOD FOR ADMINISTERING BATCH JOBS

BACKGROUND OF THE INVENTION

The present invention is a computer software method for administering batch jobs, and more specifically scheduling, initializing, dispatching, and executing batch jobs. Preferably, the batch jobs are written as Java applications, and the batch jobs may be located on a local computer or distributed across an enterprise-wide computing system.

A batch job (also referred to as a batch program) is a computer software application (i.e., program) for performing some repetitive, low priority task that typically requires no direct external input (i.e., non-interactive, non-conversational). Common examples of batch jobs include report generation (e.g., daily, weekly, monthly reports) and data updating, backup, and sorting. Batch job administration is the scheduling, execution, etc. of batch jobs on a computer or network with minimal user supervision.

Batch jobs may be written in a variety of computer languages such as Cobol, Natural, SQL, C, C+, C++, etc. The choice of the language used to implement the batch job is heavily influenced by the resources and information required by the job during execution. For example, a batch job producing reports to show activity and modifications of customer information in a database likely would be implemented in SQL. Thus, batch jobs are often tightly coupled to the components and services that process them, thereby making it difficult to reuse the batch job in a different domain (i.e., platform) without substantial modification and rewriting. The present invention addresses this need for code reuse and platform independence by encapsulating batch jobs and providing a uniform application programming interface (API) for components and services processing the jobs.

SUMMARY OF THE INVENTION

The present invention discloses a method for processing batch jobs, comprising wrapping the batch job to create an application programming interface for communication with a batch framework, the batch framework comprising a batch dispatcher class, and the batch dispatcher class further comprising a method to execute the batch job; and invoking the batch framework according to a predetermined schedule. The batch job may reside locally with the batch framework remotely from the batch framework. In a preferred embodiment, the batch framework is invoked by a scheduling service, preferably the AutoSys scheduling service on Unix platform. The AutoSys scheduling service further executes a command line parameter, either a Unix shell script or a Windows NT batch file.

DETAILED DESCRIPTION OF THE INVENTION

Figure 1A:
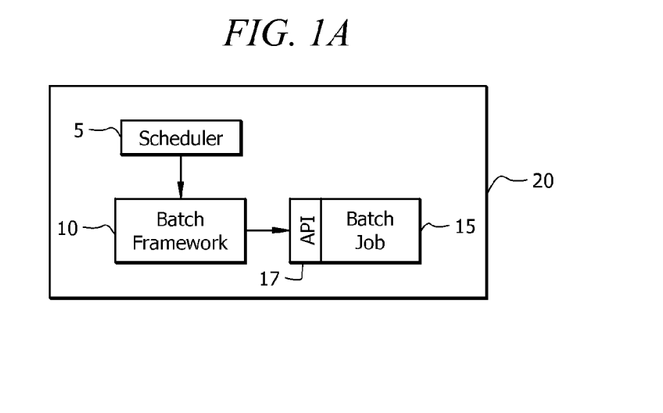
FIGS. 1A and 1B are block diagrams of a preferred embodiment of the invention wherein a batch job is executed in a local environment.
Figure 2A:
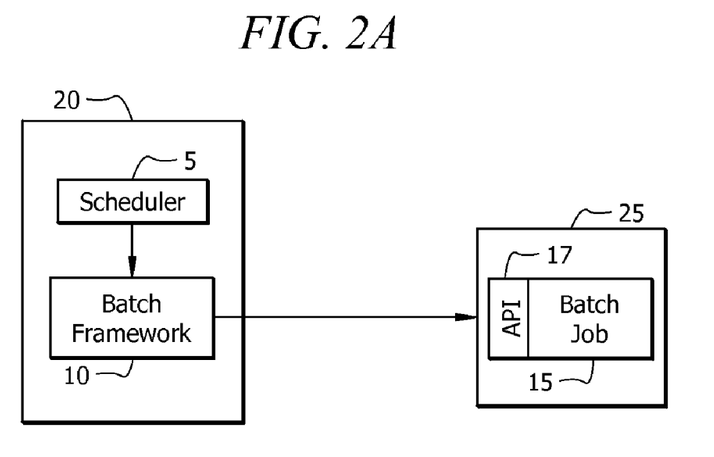
FIGS. 2A and 2B are block diagrams of a preferred embodiment of the invention wherein a batch job is executed in a distributed environment.

Referring to FIGS. 1A and 2A, scheduler 5 is attached to and invokes batch framework 10, which in turn is connected to and executes batch job 15. FIG. 1A represents a local operating environment, wherein scheduler 5, batch framework 10, and batch job 15 are all operating on a local computer 20. FIG. 2A represents a distributed operating environment, wherein scheduler 5 and batch framework 10 operate on local computer 20 to call and execute batch job 15 operating on remote computer 25. Alternative embodiments not shown include, distributing scheduler 5, batch framework 10, and batch job 15 over three separate computers, and distributing scheduler 5 on a local computer and batch framework 10 and batch job 15 on a remote computer. In either a local or distributed environment, local computer 20 and remote computer 25 each may be any suitable hardware for hosting and executing a computer application, such as a work station, personal computer, or server. Furthermore, any suitable operating system may be used on local computer 20 and remote computer 25, for example Windows, Windows NT, OS/2, UNIX, etc. In the distributed environment of FIG. 2A, local computer 20 can be linked to and communicate with remote computer 25 according to any suitable distributed computing system, for example a local or wide area network communicating via transmission control protocol/internet protocol (TCP/IP).

Batch job 15 may be any application program performing a task that lends itself to batch processing, and batch job 15 may be written in any suitable programming language. Batch job 15 has an application programming interface (API) 17, and batch framework 10 communicates with batch job 10 though API 17. An API is a language and message format used by an application program/component to communicate with another program/component (e.g., an operating system or some other system or control program). Preferably, API 17 is a Java interface, which is written in the Java programming language available from Sun Microsystems Inc., and operates within a Java virtual machine (JVM).

Figure 3:
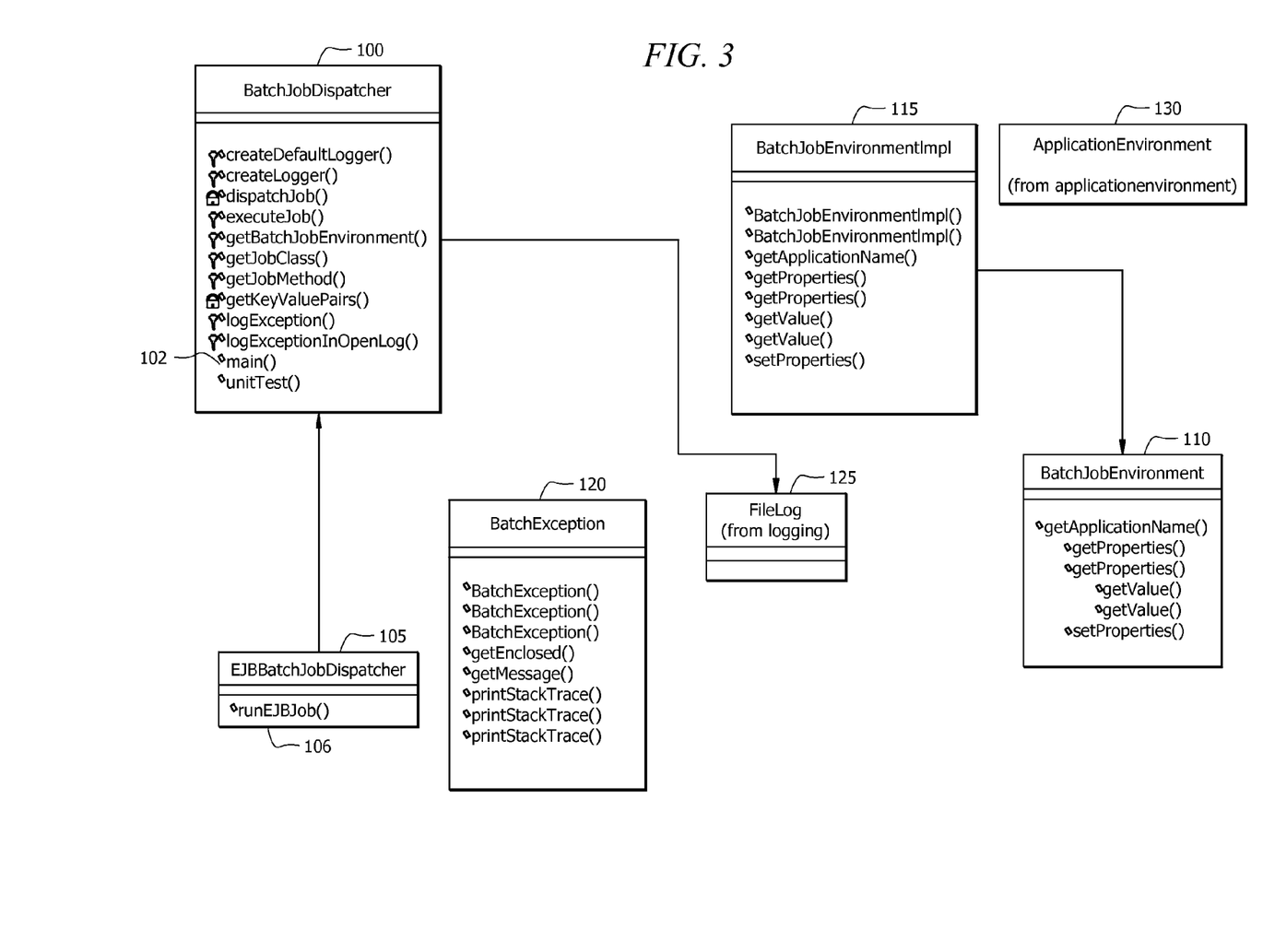
FIG. 3 is an object model, also referred to as a class diagram, of the batch framework of this invention.

Preferably, batch framework 10 is a Java framework comprising the classes shown in FIG. 3. Batch job dispatcher class 100 is the main (i.e., public) entry point into batch framework 10, this is batch job dispatcher class 100 is the executable that is invoked in order to use the functionality provided by the framework. As used in object technology, a class defines the methods and variables for a particular type of object; all objects of a given class are identical in form and behavior but contain different data in their variables. Accessors are the methods on a class that provide access to the variables of the class (for example, get and set commands). The methods and variables comprising each class are shown in FIG. 3, and it will be understood that these methods and variables may be modified by one skilled in the art without departing from the scope of the present invention.

EJB batch job dispatcher 105 is a subclass that extends batch job dispatcher class 100. EJB batch job dispatcher 105 extends the functionality of batch job dispatcher class 100 in order to run (i.e., execute) batch jobs located remotely, and specifically remote jobs operating as enterprise java beans (EJBs). While use of EJBs to run remote batch jobs is preferred, other subclasses could be added to cover running remote jobs other than EJBs.

Batch job environment 110 is an interface that defines the functionality of the implementation of a batch job environment object. An interface (also known as a message interface) is a communication surface that determines the signals (e.g., calls) that can pass through the surface; in other words, the interface defines which calls an object will respond to. That is, the interface defines the base functionality (i.e., methods) that is required for an implementation of the interface. Batch job environment implementation class 115 implements batch job environment 110. The implementation of an object consists of a class definition that implements the object interface. A batch job environment object, comprising an implementation of the batch job environment implementation class 115 upon request by batch job dispatcher class 100, contains configuration information (e.g., batch job name and run parameters) for the batch job. The configuration information is passed to the batch job (either locally or remotely) by batch job dispatcher class 100. A batch job environment object implemented from the batch job environment class is a serializeable object that can be passed to a remote batch job operating as an EJB.

Batch exception class 120 is a standard error message class corresponding to common errors (i.e., throwable exceptions) encountered in implementing the batch framework. In carrying out its functions, the batch framework may call other classes or frameworks to provide particular functionality. In the preferred embodiment of FIG. 3, batch job dispatcher class 100 calls file log class 125 (for a logging framework) to obtain file logging functionality or batch job environment 110 calls application environment class 130 (from an application environment framework) to obtain environment/configuration functionality.

Figure 1B:
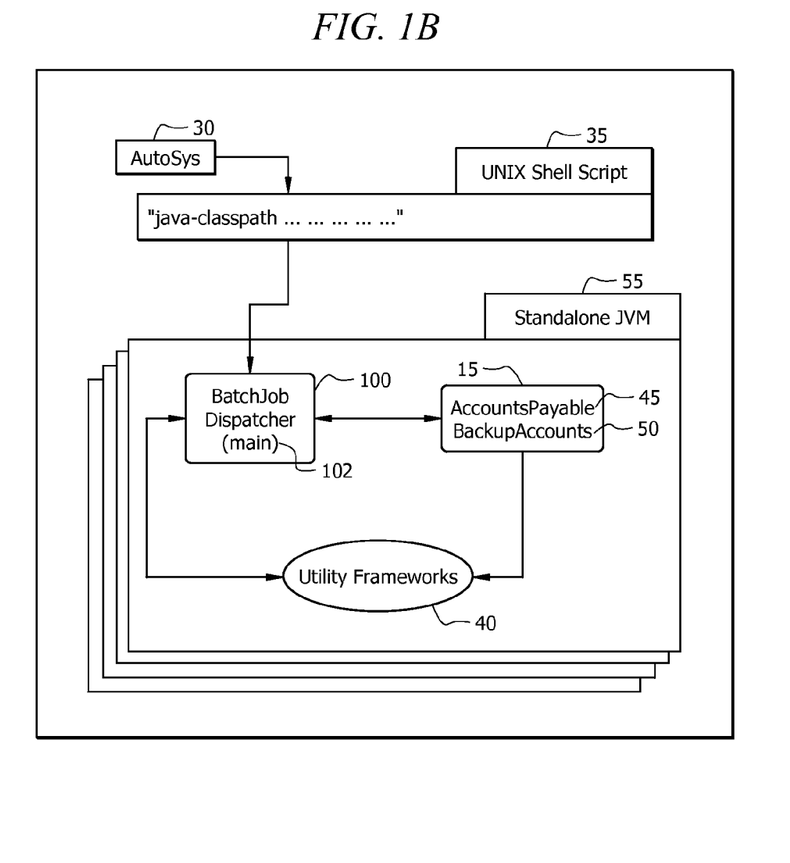
Figure 2B:
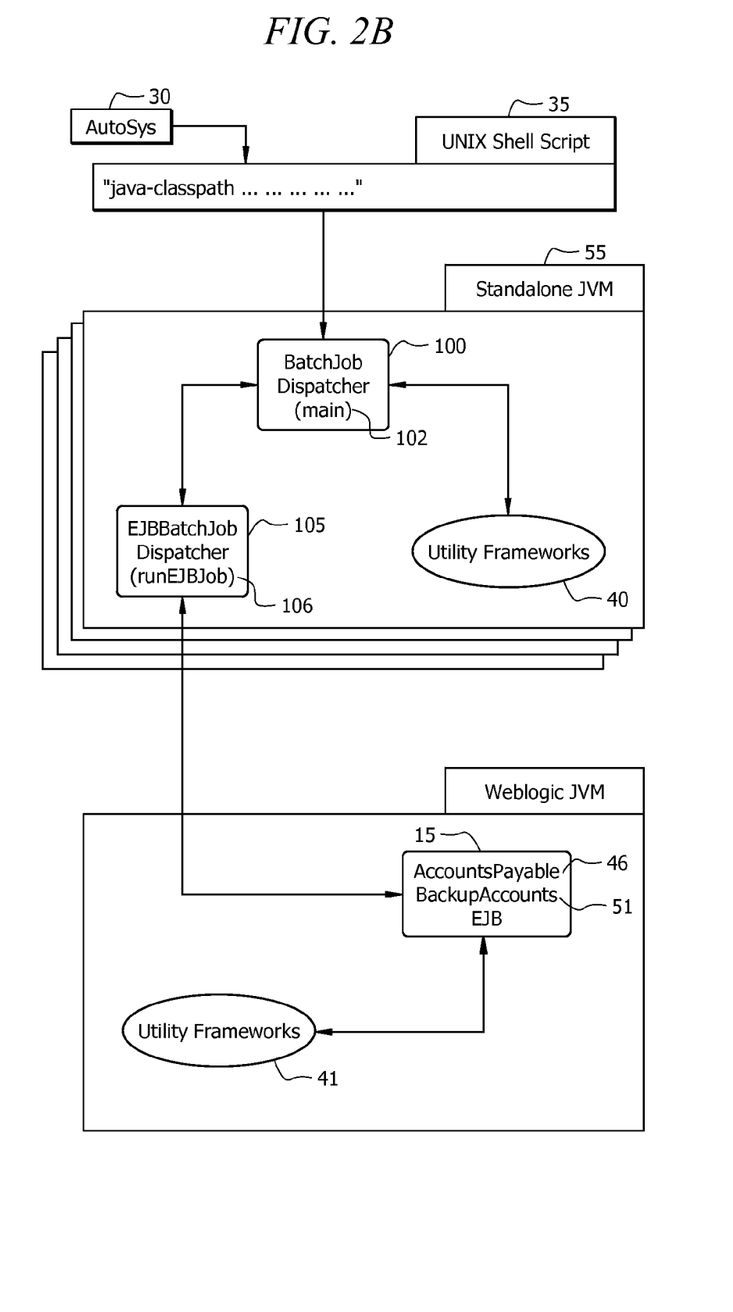

Referring generally to FIGS. 1 and 2, batch framework 10 accepts the broad batch job class (i.e., a Java class name), the specific batch job to be executed (i.e., a method name), and the parameters governing execution of the batch job (i.e., method parameters). The method of the class is executed as a batch job with the parameters supplied as arguments and the return code form the batch job method is passed back. Thus, batch framework 10 provides a simple and consistent command line interface for requesting that a batch job be executed.

FIG. 1B is a preferred embodiment of the local operating environment of FIG. 1A, wherein a standalone java batch job is executed by the batch framework in response to a request from a Unix shell script. Scheduler 10 (FIG. 1A) is an automated system (i.e., AutoSys 30) provided by the operating systems (OS) for the scheduling and management of jobs. AutoSys is the standard scheduling service available on Unix operating platforms. At a scheduled time, AutoSys 30 executes Unix shell script 35 or a Windows NT batch file. Alternatively, scheduler 10 may be incorporated into batch framework 10, for example by coding a scheduling method into batch job dispatcher class 100.

Unix shell script 35 comprises command line arguments, including the batch job name/class (e.g., accounts payable 45) and the specific method (e.g., backup accounts 50) to perform. Thus, Unix shell script 35 invokes main method 102 on batch job dispatcher class 100, passing the command line arguments. The main method, also referred to as a start method, is the entry point into the framework that creates an instance of the class. The main method is a static method rather than a member method, meaning that the main method can be invoked without instantiating the class. Batch job dispatcher class 100 retrieves a batch job environment object from batch job environment class 110, optionally using utility frameworks 40 such as an application environment framework (FIG. 3). The batch job environment is used to register a given instance of the batch job dispatcher with a utility framework such as a logging framework (FIG. 3).

Batch job dispatcher class 100 uses the Java Reflection API to find the requested job class name (e.g., accounts payable 45) within its own Java virtual machine (JVM), that is local or standalone JVM 55. The Java Reflection API is a feature in the Java programming language that allows an executing Java program to examine or "introspect" upon itself, and manipulate internal properties of the program or classes executing within a program. Batch job dispatcher 100 uses the Java Reflection API to locate the appropriate method (e.g., backup accounts 50) for the job class and invokes the retrieved method passing the application environment and properties as parameters. Batch job 15 accesses utility frameworks 40 as needed to complete processing. Batch job 15 passes return code back to batch job dispatcher class 100, which is passed all the way back to AutoSys 30.

FIG. 2B is a preferred embodiment of the distributed operating environment of FIG. 2A, wherein a remotely located enterprise Java bean (EJB) batch job is executed by the batch framework in response to a request from a Unix shell script. Scheduler 10 (FIG. 2A) is an automated system (i.e., AutoSys 30) provided by the operating systems (OS) for the scheduling and management of jobs. At a scheduled time, AutoSys 30 executes Unix shell script 35 or a Windows NT batch file. Alternatively, scheduler 10 may be incorporated into batch framework 10, for example by coding a scheduling method into batch job dispatcher class 100.

Unix shell script 35 comprises command line arguments, including the batch job name/class (e.g., accounts payable EJB 46) and the specific method (e.g., backup accounts EJB 51) to perform. Thus, Unix shell script 35 invokes main method 102 on batch job dispatcher class 100, passing the command line arguments. Batch job dispatcher class 100 retrieves a batch job environment object from batch job environment class 110, optionally using utility frameworks 40 such as an application environment framework (FIG. 3). The batch job environment is used to register a given instance of the batch job dispatcher with a utility framework such as a logging framework (FIG. 3).

Batch job dispatcher class 100 uses the Java Reflection API to find and invoke the EJB batch job dispatcher class 105 within its own Java virtual machine (JVM), that is local or standalone JVM 55. Batch job dispatcher class 105 uses Java Reflection API to locate "run EJB job" method 106 and invokes the retrieved method passing the application environment and properties as parameters.

EJB batch job dispatcher class 105 uses the Java Reflection API to find the requested job class name (e.g., accounts payable 46) located on a remote Java virtual machine (JVM), that is Weblogic JVM 55. EJB batch job dispatcher 105 uses the Java Reflection API to locate the appropriate method (e.g., backup accounts EJB 51) for the job class and invokes the retrieved method passing the application environment and properties as parameters. Batch job 15 accesses utility frameworks 41 as needed to complete processing. Batch job 15 passes return code back through EJB batch job dispatcher class 105 and batch job dispatcher class 100 all the way back to AutoSys 30.

The batch framework is configured (i.e., initialized) such that it has the necessary system properties for the JVM, the location of a master initialization (ini) file, and an application name as it appears in the master initialization file. Command-line parameters (e.g., the Unix shell script) preferably include the name of the batch job's Java class and name of the batch job's method. Additional parameters required by the batch job's method are placed in a key-value table and passed as one parameter to the batch job. The batch job's method should know the name of the keys to retrieve from the table.

EXAMPLES

While the code examples herein are written in the Java programming language, which is available from Sun Microsystems Inc., it is understood that other suitable programming languages may be used as will be readily apparent to one skilled in the art. Furthermore, it should be understood that the code examples are in skeleton or outline form, and are not necessarily intended to be in complete executable form, provided however that one skilled in the art could easily tailor executable code based upon these examples. The italicized text following the double backslashes (i.e., "//") is commentary text. Examples 1-3 are drawn to the preferred local environment embodiment of FIGS. 1A and 1B, and Examples 4-6 are drawn to the preferred distributed environment embodiment of FIGS. 2A and 2B.

Example 1

Assume an accounting application group wants to back up their accounts payable from 1992 to 1996. The AccountsPayable class needs configuration values from its initialization file. "Accounting" is the application name as it appears in the master initialization file, and backupAccounts is the name of the method on the AccountsPayable class. The backupAccounts method expects to receive a Properties data structure holding the key-value pairs for "startRange" and "endRange". The resulting upper-half of the shell script would read (case-sensitive):

User—Application Name found in the master init. file
APP_NAME_INIT="Accounting"
User—Batch Job Class Name
JOB_NAME="com.sprint.arch.batch.example.accounting.AccountsPayable"
User—Batch Job Method Name
METHOD_NAME="backupAccounts"
User—Key=Value parameter list (space separated)
PARAM_LIST="startRange=1992 endRange=1996"
User—Java Class Path for your Batch Job Class.
BATCH_JOB_CLASS_PATH="/home/bcamp/BJD/lib/app/accounting.jar"

A sample master initialization file for Example 1 is:

```
###############MASTER INI##################
    Accounting=d:\\data\\batch\\NT\\AccountingApp.ini
```

A sample application initialization file for Example 1 is:

```
####################Logging ###########################
; for NT, MUST use double '\' to delimit directory names i.e. '\\'
; Batch Framework will be looking for
'logging.defaultLogFile=<your default Log File>'
logging.defaultLogFile=d:\\data\\batch\\NT\\defaultLog.doc
; Log file for your application, could be anything (i.e.
key . . . '<prefix>.<key>=<your app Log File>'
logging.myLogFile=d:\\data\\batch\\NT\\defaultLog.doc
##################################################
```

Example 2

The following template applies to batch job class written in Java that will be executed in a standalone JVM from the batch framework. For each type of job to perform, preferably two methods are created. The first method is called by the batch framework, which receives a 'BatchJobEnvironment' object and a Properties table. This first method parses out any parameters from the Properties table, casts the parameters to the appropriate data type (if not a string), and invokes a second batch job method. The first job method should return an integer; and cannot throw any exceptions. Therefore, all anticipated exceptions should be handled at the first or second batch job method. A return code of '0' should be used when processing is successful. All other return codes from the batch job should be '10' or greater. Sample code is as follows:

```
public static int <Method Name>(BatchJobEnvironment, Properties) {
    <Initialize variables needed for the Logging Framework>
    <Initialize local variables>
    <Parse key-value pairs from the Properties into parameter variables>
    <Cast (if necessary) the parameters into the appropriate type>
    <Catch any exceptions that could occur with the typecast>
        <Log the error with the Logging Framework>
        <Set the appropriate return code and return it>
    <If no errors occurred, calls the underlying batch job method passing
the required parameter variables>
    <Catch the return code and pass it back to the Batch Framework>
}
```

The secondary method can receive any required parameters should perform the actual job processing. It is free to instantiate other helper classes, call other methods, or to execute all the work solely within the secondary method. The second method must return an integer and cannot throw exceptions. Sample code is as follows:

```
public|private> static int <Method Name>( <Any required job
parameters>. . . ) {
    <Initialize local variables>
    <Perform batch job work>
    <Catch any anticipated exceptions>
        <Log the error with the Logging Framework>
        <Set the appropriate return code and return it>
    <If no errors occurred, return the successful return code>
}
```

Example 3

The following is an example of a class, "AccountsPayable", which has a job method, "backupAccounts". The class definition contains constants needed for a logging framework and predetermined return codes. An AccountingException class was created to represent all caught application exceptions for the accounting package.

```
Class definition:
package com.sprint.arch.batch.example.accounting;
import java.util.Properties;
import java.util.Date;
import com.sprint.arch.logging.*;
import com.sprint.arch.batch.BatchJobEnvironment;
/**
```

-continued

```
* This type was created in VisualAge.
*/
public interface AccountsPayableReturnCodes {
    static final int SUCCESSFUL_RET_C    = 0;
    static final int DEFAULT_RET_C       = 10;
    static final int ATOI_ERR_RET_C      = 20;
    static final int INVALID_PARAM_RET_C = 21;
}
/**
* This type was created in VisualAge.
*/
package com.sprint.arch.batch.example.accounting;
import java.util.Properties;
import java.util.Date;
import com.sprint.arch.logging.*;
import com.sprint.arch.batch.BatchJobEnvironment;
/**
* This type was created in VisualAge.
*/
public class AccountsPayable implements AccountsPayableReturnCodes {
// Return Code constants have been moved to a new interface
//AccountsPayableReturnCodes which this class implements. This is
//per code review suggestions
private static final String USERID = "Accounting";
private static final String CLASS_NAME = "AccountsPayable";
// Constants for the Logger
private static final String LOGGING_PREFIX = "logging";
private static final String MY_LOG_KEY = "myLogFile";
    //Logger is created in the backupAccountsInternal method and it
//is passed to remaining methods
/**
* This method was created in VisualAge.
* @return int
* @param appCon com.sprint.arch.batch.BatchJobEnvironment
* @param p java.util.Properties
*/
public static int backupAccounts(BatchJobEnvironment batchJobEnv,
Properties p) {
return backupAccountsInternal(batchJobEnv, p,
    CLASS_NAME, LOGGING_PREFIX, MY_LOG_KEY);
}
/**
* This method was created in VisualAge.
parameters as myLogger and className are passed. this is because
the same method will be called from ejb.AccountsPayableBean class
* @return int
* @param appCon com.sprint.arch.batch.BatchJobEnvironment
* @param p java.util.Properties
*/
public static int backupAccounts(Object param1, Object param2,
Object paramN, FileLog
myLogger, String className) {
    // Do any neccessary work . . .
    try {
        // Log something if neccessary
        myLogger.logMsg(className + ":backupAccounts session:
            running . . . startRange" + param1 +
                "EndRange" + param2, LogBase.DEBUG);
        myLogger.logMsg(className + ":backupAccounts session:
            completed.", LogBase.DEBUG);
        myLogger.closeLog( );
        // woo hoo!
        return SUCCESSFUL_RET_C;
    } catch (LogMsgException e) {
        // Since logging failed, print the stack trace.
        // Note: deciding whether or not to return a successfully
        //return code here should be driven
        // by the requirements and logic of your application
        // batch job.
        e.printStackTrace( );
        return DEFAULT_RET_C;
    }
}
/**
* This method was created in VisualAge.
* @return int
* @param appCon com.sprint.arch.batch.BatchJobEnvironment
* @param p java.util.Properties
*/
```

-continued

```
public static int backupAccountsInternal(BatchJobEnvironment
    batchJobEnv, Properties p, String className, String
    loggingPrefix, String myLogKey) {
// Needed for my Logger's logMsg
String method_name = "backupAccounts";
int retC = DEFAULT_RET_C;
String myLogFileName = batchJobEnv.getValue(loggingPrefix
    ,myLogKey);
FileLog mylogger = null;
try {
    // Establish my mylogger
    mylogger = new FileLog(LogBase.DEBUG, LogBase.DEBUG,
        myLogFileName, true);
} catch (java.io.IOException ioe) {
    //Since logging failed, print the stack trace
    ioe.printStackTrace( );
}
try {
    // register this session with my logger
    Date todaysDate = new Date( );
    mylogger.logMsg(todaysDate.toString( ), LogBase.DEBUG);
    mylogger.logMsg("Begining" + className + ":backupAccounts
        session . . . ", LogBase.DEBUG);
} catch (LogMsgException e) {
    //Since logging failed, print the stack trace
    e.printStackTrace( );
}
// Fetch the parameters this method cares about.
String startRangeString = p.getProperty("startRange");
String endRangeString = p.getProperty("endRange");
// Cast (if necessary) the parameters into the appropriate type.
try {
    if (startRangeString == null && endRangeString == null) {
        return retC;
    }
    Integer startRangeInt = Integer.valueOf(startRangeString);
    Integer endRangeInt = Integer.valueOf(endRangeString);
} catch (NumberFormatException e) {
    // The string could not be converted into an integer.
    // Log the exception and location with the Logger
    String message = "Error attempting to convert a String" +
        "parameter to an integer.";
    try {
        mylogger.logMsg(message, LogBase.WARNING);
    } catch (LogMsgException e2) {
        //Since logging failed, print the stack trace
        e2.printStackTrace( );
    }
    return ATOI_ERR_RET_C;
}
// Calls a method with the same name and the relevant parameters.
return backupAccounts(startRangeString
    endRangeString,null,mylogger,className);
}
}
```

Example 4

Assume an accounting application group wants to back up their accounts payable from 1992 to 1996 and that the accounting group chose to implement their AccountsPayable batch job as an Enterprise Java Bean (EJB). The AccountsPayableEJBObj EJB needs to access the initialization framework and "Accounting" is the application name as it appears in the master initialization file. The application name, "Accounting", need only appear in the master initialization file on the platform where the BatchJobDispatcher executes and does not have to be on the platform where the EJB is deployed. (These two platforms are not necessarily the same.) "AccountsPayableEJBObj" is the application name of the EJB, as defined in the application's initialization file by the entries with an 'ejb' prefix. The name of the method on the AccountsPayableEJBObj EJB is backupAccounts. The backupAccounts method expects to receive a Properties data structure holding the key-value pairs for "startRange" and "endRange". The resulting upper-half of the shell script would look like (case-sensitive):

```
# User—Application Name found in the master init. file
APP_NAME_INIT="Accounting"
# User—Batch Job Class Name as found in the with an
    'ejb'   prefix   in   the   ini   file
    EJB_JOB_NAME="AccountsPayableEJBObj"
# User—EJB Batch Job Method Name
EJB_METHOD_NAME="backupAccounts"
# User—Key=Value parameter list (space separated)
PARAM_LIST="startRange=1992 endRange=1996"
```

A sample master initialization file for Example 4 is:

```
##############MASTER INI##################
Accounting=d:\\data\\batch\\NT\\AccountingApp.ini
```

A sample application initialization file for Example 4 is:

```
##############EJBs ##################
ejb.AccountsPayableEJBObj=
com.sprint.arch.batch.example.accounting.ejb.AccountsPayableHome
; For every EJB above, you must provide its provider url and it's initial
context factory.
;EJB deployed on a WebLogic server
;AccountsPayableEJBObj.java.naming.factory.initial=
weblogic.jndi.TengahInitialContextFactory
;AccountsPayableElBObj.java.naming.provider.url=t3://localhost:7001
;EJB deployed on a Websphere server
AccountsPayableEJBObj.java.naming.provider.url=IIOP:///
AccountsPayableEJBObj.java.naming.factory.initial=
com.ibm.jndi.CosNaming.CNInitialContextFactory
##################################
##############Logging ##############################
; for NT, MUST use double '\' to delimit directory names i.e. '\\'
; Batch Framework will be looking for 'logging.defaultLogFile=<your
default Log File>'
logging.defaultLogFile=
h:\\batch_job_example\\data\\batch\\NT\\defaultLog.txt
; Log file for your application, could be anything (i.e.
key . . .'<prefix>.<key>=<your app Log File>'
logging.myLogFile=
h:\\batch_job_example\\data\\batch\\NT\\defaultLog.txt
##################################
```

Example 5

The following template applies to any batch job class written in Java that will be executed as an Enterprise Java Bean (EJB) in a WebLogic JVM from the batch framework. For each type of job to perform, two methods should be created. The first method is called by the batch framework, which receives a 'BatchJobEnvironment' object and a Properties table. The method is an instance method, not static. The first method parses out any parameters from the Properties table, casts the parameters to the appropriate data type (if not a string), and invokes a second batch job method. The first job method should return an integer, and cannot throw any exceptions. Therefore, all anticipated exceptions should be handled at the first or second batch job method. A return code of '0' should be used when processing is successful. All other return codes from the batch job should be '10' or greater. Sample code is as follows:

```
public int <Method Name>( BatchJobEnvironment,Properties) {
    <Initialize variables needed for the Logging Framework>
    <Initialize local variables>
    <Parse key-value pairs from the Properties into parameter variables>
    <Cast (if necessary) the parameters into the appropriate type>
    <Catch any exceptions that could occur with the typecast>
        <Log the error with the Logging Framework>
        <Set the appropriate return code and return it>
    <If no errors occurred, called the underlying batch job method
passing the parameter variables>
        <Catch the return code and pass it back to the Batch Framework>
}
```

The secondary method receives any required parameters and performs the actual job processing. It is free to instantiate other helper classes, call other methods, or to execute all the work solely within the secondary method. The second method should return an integer and cannot throw exceptions. Sample code is as follows:

```
public|private> int <Method Name>(
    <Required job parameters>. . . )
{
    <Initialize variables needed for the Logging Framework>
    <Initialize local variables>
    <Perform batch job work>
    <Catch any anticipated exceptions>
        <Log the error with the Logging Framework>
        <Set the appropriate return code and return it>
    <If no errors occurred, return the successful return code>
}
```

Example 6

The following is an example of an EJB remote interface, "AccountsPayableEJBObj," which has a bean, "AccountsPayableBean," and a job method, "backupAccounts." The class definition contains constants needed for a logging framework and predetermined return codes. An AccountingException class was created to represent all caught application exceptions for the accounting package.

```
Class definition:
package com.sprint.arch.batch.example.accounting.ejb;
/**
* This is a Session Bean Class
*/
import javax.ejb.*;
import java.util.Properties;
import java.util.Date;
//--------- Arch packages
import com.sprint.arch.logging.*;
import com.sprint.arch.configuration.*;
import com.sprint.arch.batch.BatchJobEnvironment;
import com.sprint.arch.applicationenvironment.
    ApplicationEnvironmentManager;
import com.sprint.arch.batch.example.accounting.*;
public class AccountsPayableBean implements javax.ejb.SessionBean {
    private javax.ejb.SessionContext mySessionCtx = null;
    // Return Code constants - not required as it just uses the
    //sprint.arch.batch.example.accounting.AccountsPayable
    //class for its business
    //methods.
    // Constants for the Logger
    private static final String USERID = "Accounting";
    private static final String CLASS_NAME =
            "AccountsPayableBean";
```

-continued

```
    private static final String LOGGING_PREFIX = "logging";
    private static final String MY_LOG_KEY = "myLogFile";
    //Logger
    //protected FileLog logger = null;
/**
* This method was created in VisualAge.
* @return int
* @param batchJobEnv com.sprint.arch.batch.BatchJobEnvironment
* @param p java.util.Properties
*/
//this method simply calls the AccountsPayable batch job method
//-modified as per code review suggestions
public int backupAccounts(BatchJobEnvironment batchJobEnv,
        Properties p)
{
    return com.sprint.arch.batch.example.accounting.
        AccountsPayable.backupAccountsInternal(batchJobEnv,
        p, CLASS_NAME, LOGGING_PREFIX, MY_LOG_KEY);
}
/**
* ejbActivate method comment.
*/
public void ejbActivate( ) {
}
/**
* ejbCreate method comment.
*/
public void ejbCreate( ) {
}
/**
* ejbPassivate method comment.
*/
public void ejbPassivate( ) {
}
/**
* ejbRemove method comment.
*/
public void ejbRemove( ) {
}
/**
* setSessionContext method comment.
*/
public void setSessionContext(javax.ejb.SessionContext ctx) {
    mySessionCtx = ctx;
}
}
```

What is claimed is:

1. A method for processing a batch job, comprising:
wrapping the batch job to create an application programming interface for communication with a batch framework, the batch framework comprising a batch dispatcher class, and the batch dispatcher class further comprising a method to execute the batch job, wherein the batch job performs a repetitive, low priority task that typically requires no direct external input; and
invoking the batch framework according to a predetermined schedule via execution of a command line parameter, wherein the method provides for efficient reuse of programming code and platform independence by encapsulating the batch job and providing a uniform application programming interface for processing the batch job according to the method.

2. The method of claim 1 wherein the batch job resides locally with the batch framework.

3. The method of claim 1 wherein the batch job resides remotely from the batch framework.

4. The method of claim 1 wherein the batch framework is invoked by a scheduling service.

5. The method of claim 2 wherein the batch framework is invoked by a scheduling service.

6. The method of claim 3 wherein the batch framework is invoked by a scheduling service.

7. The method of claim 4 wherein the scheduling service is AutoSys.

8. The method of claim 7 where the AutoSys further executes the command line parameter.

9. The method of claim 8 wherein the command line parameter is a Unix shell script.

10. The method of claim 8 wherein the command line parameter is a Windows NT batch file.

11. The method of claim 5 wherein the scheduling service is AutoSys.

12. The method of claim 11 where the AutoSys further executes the command line parameter.

13. The method of claim 12 wherein the command line parameter is a Unix shell script.

14. The method of claim 12 wherein the command line parameter is a Windows NT batch file.

15. The method of claim 6 wherein the scheduling service is AutoSys.

16. The method of claim 15 where the AutoSys further executes the command line parameter.

17. The method of claim 16 wherein the command line parameter is a Unix shell script.

18. The method of claim 16 wherein the command line parameter is a Windows NT batch file.

19. The method of claim 1 wherein the batch framework is a Java framework.

20. The method of claim 1 wherein the application programming interface for communication with the batch framework is a Java application programming interface.

21. The method of claim 1 wherein the command line parameter comprises a class name, a method name, and one or more method parameters.

* * * * *